Feb. 16, 1926. 1,572,872
F. L. ALBEN
DRIVER BRAKE SHOE
Filed Sept. 20, 1923

WITNESSES:
R. S. Harrison
W. B. Jaspert

INVENTOR,
Frank L. Alben
BY
ATTORNEY

Patented Feb. 16, 1926.

1,572,872

UNITED STATES PATENT OFFICE.

FRANK L. ALBEN, OF WILKINSBURG, PENNSYLVANIA, ASSIGNOR TO WESTINGHOUSE ELECTRIC & MANUFACTURING COMPANY, A CORPORATION OF PENNSYLVANIA.

DRIVER BRAKE SHOE.

Application filed September 20, 1923. Serial No. 663,736.

*To all whom it may concern:*

Be it known that I, FRANK L. ALBEN, a citizen of the United States, and a resident of Wilkinsburg, in the county of Allegheny and State of Pennsylvania, have invented a new and useful Improvement in Driver Brake Shoes, of which the following is a specification.

My invention relates to railway vehicles, more especially to brake mechanisms for the driving wheels of railway vehicles having driving motors journalled on the wheel axles.

It is among the objects of my invention to provide a brake mechanism of simple and compact mechanical structure which shall be efficient in its operation and all the parts of which shall be readily accessible.

It is a further object of my invention to provide a brake mechanism of the pressure-actuated type which shall be especially applicable to railway vehicles having motors journalled on the wheel axles and in which the linkage and operating mechanism of the brakes are mounted on and supported by the motor housing.

In vehicles embodying the axle-hung type of motor mountings, the brake members are hung from the vehicle frame in the usual position below the longitudinal center line of the wheel axle. In this type of brake mounting, the drive motors and connecting gear-wheels are inaccessible and it is necessary to drop the car wheels from their journals to reach the motor parts.

In my present invention, I provide a type of brake member that is mounted on the motor frame and is removable with the motor. The brake shoe is mounted vertically with respect to the wheel axle and above the motor housing, which permits of free access to the drive gears connecting the axle and motor shaft.

In the accompanying drawing consituting a part hereof and in which like reference characters designate like parts, Fig. 1 is an end elevational view of a portion of a railway vehicle embodying the principles of my invention.

Figure 1:
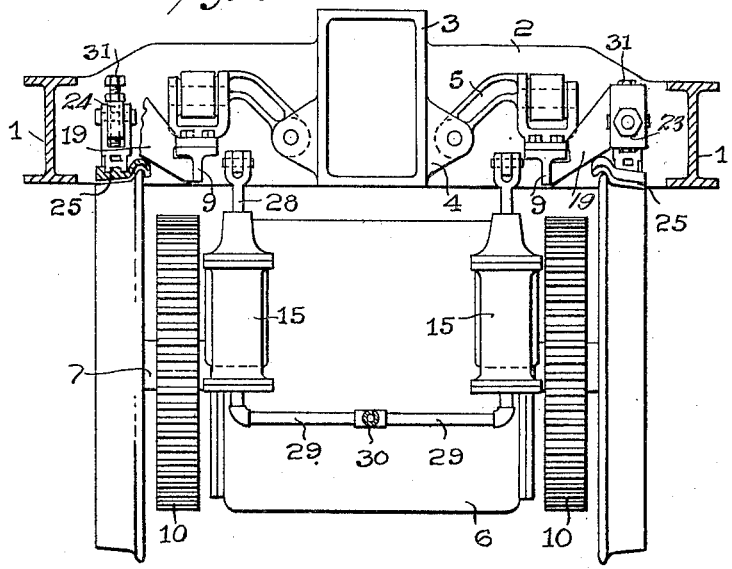
Figure 2:
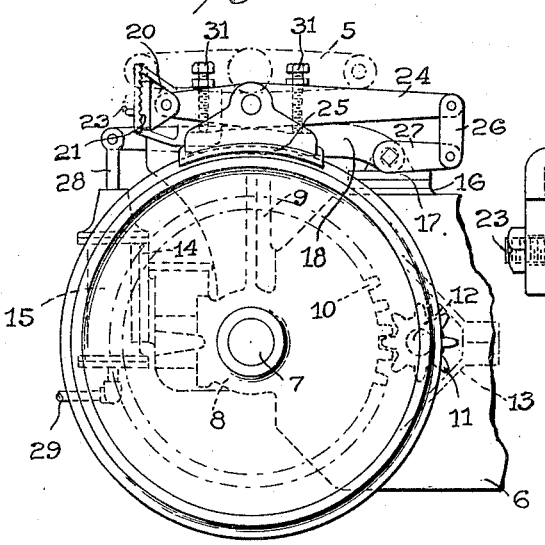
Fig. 2 is a side elevational view thereof.

Referring to Figs. 1 and 2, the structure therein illustrated comprises side frames 1, having a transverse tie-rod 2 carrying a longitudinal box girder 3, which is formed integral therewith. The box girder 3 is provided with laterally extending brackets 4 carrying pivot arms 5 which constitute a stabilizing mechanism that is no part of my present invention.

A drive motor 6 is journalled on a wheel axle 7 by an extension bracket 8 having a vertically extending column 9, which is associated with the stabilizing arm 5. The motor 6 is geared to the axle 7 by means of a gear-wheel and a pinion 10 and 11, which are respectively mounted on the axle 7 and motor shaft 12. A gear-case 13 is disposed around the gear-wheel and pinion to protect them from grit and to provide a lubricating chamber therefor.

Figure 4:
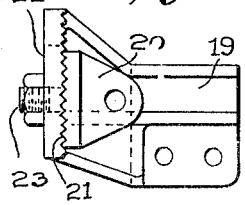
Figs. 4 and 5 are, respectively, a view in side elevation and a plan view of an adjustable bracket by means of which adjustments may be made for taking up wear on shoes.
Figure 5:
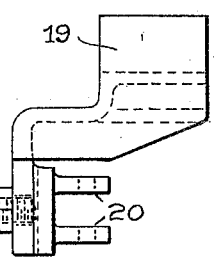
Figure 3:
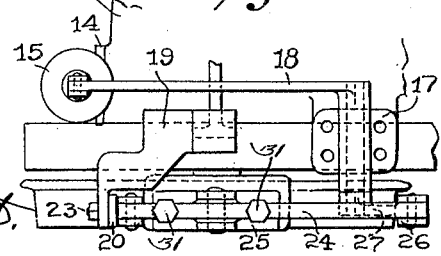
Fig. 3 is a partial plan view of the brake shoe linkage.

The motor bracket 8 is provided with a plurality of vertically disposed pads 14 for mounting piston cylinders 15, and the top of the motor frame 6 is provided with pads 16 for mounting brackets 17 on which bell-cranks 18 are pivotally mounted. An adjustable bracket 19, best shown in Figs. 4 and 5, is mounted on each column 9 of the motor frame, as shown in Figs. 1 and 2, and is provided with a vertically adjustable lug 20 having teeth or jaws 21 that are adapted to engage similar jaws on the bracket 19. Each bracket is further provided with an elongated opening 22 to permit adjustment of a stud bolt 23 extending from the lug 20. The purpose of this adjustment will be hereinafter set forth.

A brake lever 24 is pivotally connected to each lug 20 and has a brake shoe 25 pivotally mounted thereon. The extended end of the lever 24 is connected by a link 26 to the shorter arm 27 of one of the bell cranks 18. The other end of each bell crank is connected to a piston-rod 28, which is operatively disposed in the corresponding cylinder 15. The cylinders 15 are joined by pipes 29, which are connected to a supply line 30 of a suitable source of pressure, such as an air compressor or the like. The brake shoes are thus mounted vertically over the wheel axles and above the drive motor, thereby affording easy access to all moving parts.

The operation of the brake mechanism is briefly as follows:

The brake shoes 25 are actuated by the piston-rods 28 through the bell cranks 18, which are connected by the links 26 to the respective brake arms 24. The brake shoes 25 are adjusted in position by adjusting the lugs 20 vertically on the respective brackets 19 and securing them in their operative positions by tightening the nuts on the studs 23. The shoes 25 are maintained in their normal operative position by adjusting bolts 31, in accordance with a familiar practice.

It will be noted that the entire brake mechanism comprising the cylinders 15, the adjustable brackets 19, and the levers and links are supported on the motor 6, which is an entirely novel feature of this design, and gives free access to all the parts of the drive mechanism comprising the wheel axles, motor shafts and connecting gearwheels.

It is evident from the above description of my invention that the braking device constitutes a simple, durable structure that is relatively inexpensive to manufacture and is especially applicable to the type of motor drives in which the motors are journalled directly upon the wheel axles. Although the mechanism itself is old in the art, the type of mounting and the association of the several parts is entirely novel.

Although I have described a specific embodiment of my invention, it will be obvious to those skilled in the art that various changes may be made in the proportion and relative locations of the several parts without departing from the principles herein set forth.

I claim as my invention:

1. The combination with a drive motor journalled on a wheel axle, of a brake mechanism mounted on the top of said motor frame, said brake mechanism being operatively associated with the wheels of said axle.

2. The combination with a drive motor journalled on a wheel axle, of a brake mechanism mounted on the top of said motor frame and operatively associated with the wheels of said axle, said mechanism comprising a plurality of pistons operatively mounted on the motor frame, a plurality of brake shoes, and a plurality of links and levers for connecting said pistons to said brake shoes.

3. The combination with a drive motor journalled on a wheel axle, of a brake mechanism mounted on the top of said motor frame and operatively associated with the wheels of said axle, the shoes of said mechanism being in substantial vertical alinement with said axle.

4. The combination with a drive motor journalled on a wheel axle, of a brake mechanism mounted on said motor and operatively associated with the wheels of said axle, the shoes of said mechanism being in substantial vertical alinement with said axle, and a pair of pressure-actuated pistons secured to said motor, said shoes being operatively linked to said pistons.

5. The combination with a drive motor journalled on a wheel axle, of a brake mechanism mounted on said motor, said mechanism comprising a pair of shoes adapted to exert a pressure in a vertical direction on the wheels, a plurality of levers pivotally connected to said shoes and mounted on the motor frame, and a pair of pistons operatively connected by said levers and secured to said motor.

6. The combination with a railway vehicle drive motor, of a brake mechanism and pressure-actuated means mounted on said motor, the mechanism comprising a plurality of brake shoes adapted to engage a pair of vehicle wheels and said means comprising plurality of pistons linked to said shoes and secured to the motor frame.

7. The combination with a railway vehicle drive motor of a brake mechanism and pressure actuated means mounted thereon, said brake mechanism comprising horizontally disposed brake shoes in vertical alinement with a wheel axle and linked to said actuated means, and adjusting means comprising a movable bracket for said brake shoes.

8. The combination with a railway vehicle drive motor of a brake mechanism and pressure actuated means mounted on said motor said mechanism being vertically located with reference to a wheel axle and the motor, and said actuated means comprising liquid pressure cylinders being mounted on the side of said motor and axle.

In testimony whereof, I have hereunto subscribed my name this 11th day of September 1923.

FRANK L. ALBEN.